(12) United States Patent
Kanerva et al.

(10) Patent No.: US 8,983,050 B2
(45) Date of Patent: *Mar. 17, 2015

(54) HANDLING OF FORWARDED CALLS

(75) Inventors: Mikko Kanerva, Helsinki (FI); Pekka Hämäläinen, Vantaa (FI); Seppo Huotari, Espoo (FI); Erkki Yli-Juuti, Helsinki (FI)

(73) Assignee: Nokia Corporation, Espoo (FI)

( * ) Notice: Subject to any disclaimer, the term of this patent is extended or adjusted under 35 U.S.C. 154(b) by 1199 days.

This patent is subject to a terminal disclaimer.

(21) Appl. No.: 11/444,785

(22) Filed: May 31, 2006

(65) Prior Publication Data

US 2006/0222157 A1   Oct. 5, 2006

Related U.S. Application Data

(63) Continuation of application No. 09/674,101, filed on Oct. 26, 2000, now Pat. No. 7,095,838.

(30) Foreign Application Priority Data

May 5, 1998   (FI) .......................................... 980991

(51) Int. Cl.
  *H04M 3/42* (2006.01)
  *H04M 3/38* (2006.01)
  *H04M 3/54* (2006.01)
  *H04Q 3/00* (2006.01)

(52) U.S. Cl.
  CPC *H04M 3/38* (2013.01); *H04M 3/54* (2013.01); *H04Q 3/0029* (2013.01)
  USPC ...... 379/211.02; 379/196; 455/406; 455/417; 455/445

(58) Field of Classification Search
  USPC ............... 379/211.01–211.02, 212.01, 88.26, 379/196; 455/417, 432.1–433, 406, 445
  See application file for complete search history.

(56) References Cited

U.S. PATENT DOCUMENTS

| | | | |
|---|---|---|---|
| 4,893,336 A | 1/1990 | Wuthnow | 379/211 |
| 5,168,517 A | 12/1992 | Waldman | 379/67 |
| 5,473,671 A | 12/1995 | Partridge, III | 379/59 |
| 5,553,128 A | 9/1996 | Grimes | 379/211 |
| 5,592,541 A | 1/1997 | Fleischer, III et al. | 379/211 |
| 5,615,253 A | 3/1997 | Kocan et al. | 379/196 |
| 5,651,053 A | 7/1997 | Mitchell | 379/67 |

(Continued)

FOREIGN PATENT DOCUMENTS

| | | |
|---|---|---|
| EP | 0 216 381 | 4/1987 |
| EP | 0 676 884 A2 | 10/1995 |

(Continued)

*Primary Examiner* — Md S Elahee
(74) *Attorney, Agent, or Firm* — Harrington & Smith (57) ABSTRACT

This invention presents a service of barring the forwarded calls. According to the invention, a subscriber may define in his subscriber information that all calls forwarded to him are to be rejected. In response to receiving a request for establishing a call to a subscriber, his subscriber information is checked to find out if he has defined that calls forwarded to him are to be rejected. If the subscriber information shows that the subscriber wishes to reject the forwarded incoming calls, the call establishment signaling is studied to find out if the call has been forwarded. If the call is determined to have been forwarded, the call is rejected. In a preferred embodiment the subscriber may define a set of allowed numbers from which even the forwarded calls are to be accepted.

18 Claims, 6 Drawing Sheets

(56) References Cited

U.S. PATENT DOCUMENTS

| | | | |
|---|---|---|---|
| 5,790,638 A * | 8/1998 | Bertacchi | 379/88.26 |
| 5,878,338 A | 3/1999 | Alperovich et al. | 455/417 |
| 6,091,949 A | 7/2000 | Sanchez | 455/417 |
| 6,125,126 A | 9/2000 | Hallenstal | 370/522 |
| 6,381,320 B1 | 4/2002 | Creamer et al. | 379/201.01 |
| 6,397,058 B1 | 5/2002 | Thibert et al. | 455/414 |
| 6,487,600 B1 | 11/2002 | Lynch | 709/229 |

FOREIGN PATENT DOCUMENTS

| | | |
|---|---|---|
| EP | 0 696 146 A2 | 2/1996 |
| WO | WO 98/05153 | 2/1998 |

* cited by examiner

HANDLING OF FORWARDED CALLS

PRIORITY STATEMENT

This application is a continuation of U.S. patent application Ser. No. 09/674,101, which entered U.S. National Stage on Oct. 26, 2000 now U.S. Pat. No. 7,095,838. This application claims priority to Finland Patent Application 980991 (filed on May 5, 1998) through PCT/FI99/00345 filed on (Apr. 28, 1999) and the above-referenced US application, the latter which is allowed by Notice dated Jan. 23, 2006.

FIELD OF THE INVENTION

This invention concerns the handling of forwarded calls.

BACKGROUND OF THE INVENTION

Call forwarding is one of the most commonly used services in modern telecommunication networks. A subscriber can specify that calls destined to him are to be forwarded to another subscriber's number. For example, Beth can transfer her calls to Cindy when leaving her home to visit Cindy. A subscriber can specify that his calls be forwarded in various situations. For example, when the CFU (Call Forwarding Unconditional) service is activated, all the calls destined to the subscriber are forwarded to a given number. In the CFB (Call Forwarding on Busy) service, calls are forwarded if the called subscriber is busy. By activating the CFNRy (Call Forwarding on No Reply) service, the subscriber instructs that his calls are to be forwarded after 4 alert tones, for example, if the call is not answered before that. For mobile subscribers the CFNRc (Call Forwarding on Not Reachable) service can be defined. In CFNRc the calls are forwarded if the subscriber is not in the coverage area of the mobile telecommunication network, or if he has turned off his mobile station.

Figure 1:
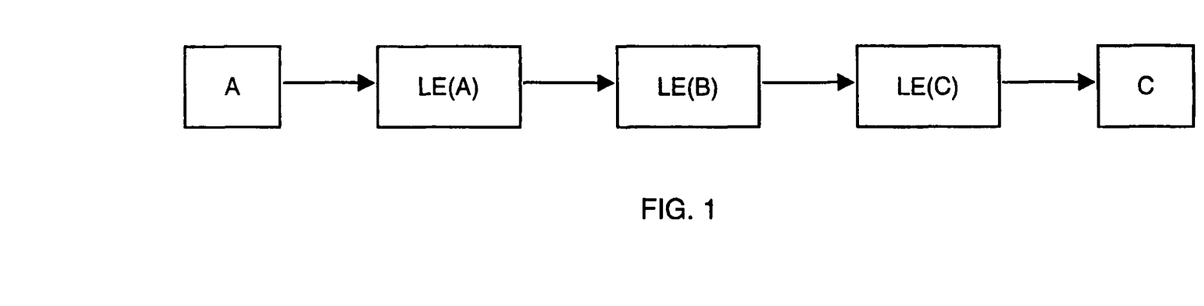
FIG. 1 shows a forwarded call.

The routing of forwarded calls, as well as the charging principle for forwarded calls, are shown in: FIG. 1. In the figure, the calling party A makes a call to B. B has forwarded his calls to C. This is done by giving the exchange of B instructions to forward the calls addressed to B to a third party C. Both B and C are fixed network subscribers. A may be a fixed network subscriber or a mobile network subscriber. The call is first routed from A via his Local Exchange LE(A) to the local exchange LE(B) of B. Information concerning the specified call forwarding is stored in LE(B). In response to having received the request for call establishment from LE(A), LE(B) notices that the call is to be forwarded to C. In response to that, LE(B) routes the call to the forwarded to party C via the local exchange LE(C) of C. LE(B) becomes the transit point of the call. The first call leg from A to LE(B) is paid by subscriber A. The forwarded leg from LE(B) to C is paid by subscriber B.

Figure 2:
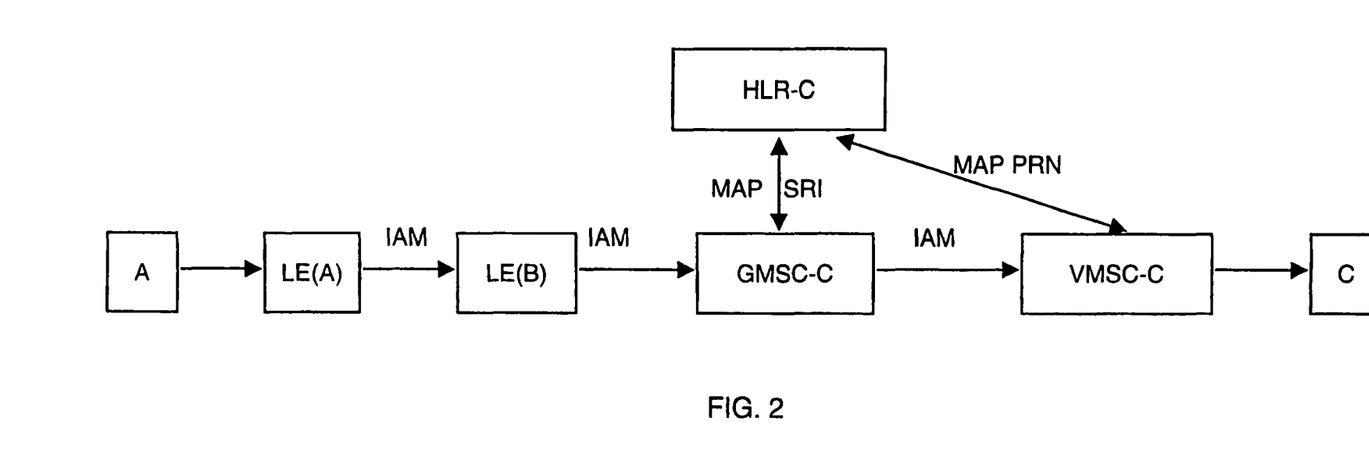
FIG. 2 show a call forwarded to a mobile subscriber.

In FIG. 2 is shown a situation where the call is forwarded to mobile subscriber. In this example, both A and B subscribers are fixed network subscribers. However, they can also be mobile subscribers without causing any remarkable changes in the process. When compared to the case shown in FIG. 1, the only difference is the leg between LE(B) and subscriber C. This is due to the basic feature of mobile telecommunication systems: the location of the subscriber is not fixed. Therefore, the location of the subscriber has to be ascertained before establishing the connection.

In modern mobile telecommunications networks, the network maintains information about the location of the mobile subscribers. In the GSM network used as an example in this application, this information is distributed between the home location register HLR and visitor location registers VLR directly connected to mobile services switching centers MSC. The HLR is in the home network of the mobile subscriber and contains the permanent subscriber information and the location information of the mobile subscriber with an accuracy of one VLR area. The VLR area typically equals the area served by one mobile services switching center. The VLR of the visited mobile services switching center VMSC responsible for the area the subscriber is currently visiting contains more exact information about the subscriber's location.

On the leg from LE(B) to subscriber C, the call is first routed to the gateway mobile services switching center GMSC(C) of subscriber C. GMSC(C) is basically any MSC capable of making interrogations to the home location register HLR(C) of subscriber C. In response to having received the HLR inquiry, i.e. the query for routing information, the HLR ascertains the VLR the subscriber is currently visiting, and sends a request PRN (Provide Roaming Number) for a roaming number to that VLR, i.e. VLR(C).

In response VLR(C) returns HLR(C) a roaming number MSRN (Mobile Subscriber Roaming Number) identifying the called subscriber in this VLR. HLR(C) forwards the roaming number to GMSC(C). GMSC(C) adds to the call record comprising information of the call information that subscriber C is receiving the call in the area of VLR(C). Using the received identification MSRN and the message IAM(MSRN) (IAM=Initial Address Message), GMSC(C) establishes a connection to the MSC VMSC(C) currently visited by subscriber C. To identify the called subscriber corresponding to the received roaming number with his identity number IMSI or TMSI (Temporary Mobile Subscriber Identity) VMSC(C) makes a query to VLR(C), which then returns this information. According to the specifications, this is done using messages SIFIC (Send Info For Incoming Call) and CC (Complete Call). Having ascertained the identity of the called subscriber, VMSC(C) now establishes the final leg of the call to the called subscriber.

In GSM, the basic principle in charging is that the calling subscriber pays the leg between himself and the home network HPLMN(B) (HPLMN=Home Public Land Mobile Network) of the called subscriber. The rest of the route is paid by the called subscriber. The idea here is that the calling subscriber should not have to pay a surprisingly high price for his call, for example, when the called subscriber is roaming in a distant country. According to this principle, when subscriber A in Finland calls a mobile subscriber B whose home network is in New Zealand but who is currently roaming in Finland, the call is routed via New Zealand. Subscriber A pays the leg from Finland to New Zealand and subscriber B the leg from New Zealand back to Finland.

Due to this charging principle, the forwarding subscriber B pays for the leg between LE(B) and the home network of C and subscriber C from his home network onwards. It should be noted that for most operators, reception of calls is free in the home network HPLMN (Home Public Land Mobile Network) of the subscriber. However, when the subscriber is roaming outside his home network, he is charged for the roaming leg from his own home network to the VPLMN (Visited Public Land Mobile Network) he is currently visiting.

The call transfers may be annoying to the subscriber to whom the calls have been transferred especially if he is roaming abroad. An example of such an annoying situation is a malicious call forwarding. In addition to malicious call forwarding, calls may be transferred to a wrong number because of a type mismatch when entering the call transfer command to transfer all the incoming calls of the exchange of a company, for example. The subscriber to whom the calls are forwarded to may, of course, define all his incoming calls to be barred. However, the use of barring of incoming calls prevents him from receiving the calls directed to him directly, i.e. without the malicious or accidental forwarding defined by the forwarding party.

WO98/05153 teaches a method for barring calls forwarded from a certain number. The barring allows a user to selectively to prevent calls from incoming, if they are forwarded from a certain pre-defined number. This provides a solution to a problem of selectively barring calls forwarded by a certain forwarding number.

The objective of this invention is to solve the above-mentioned problem of the prior art. This objective is achieved using the method and apparatus specified in the independent claims.

SUMMARY OF THE INVENTION

According to a first aspect of the invention, a method is provided for handling calls in a telecommunication system comprising subscribers and network elements such as exchanges, comprising the steps of:

storing in the system subscriber information including service definitions of a subscriber;

establishing connections to the subscriber via a network element having access to the subscriber information to the subscriber;

allowing a subscriber to define in his subscriber information that his incoming calls are to be forwarded to another subscriber; and indicating the forwarding of a call and optionally caller's identity in the call establishment signaling;

characterized in that the method further comprises the steps of:

storing a group of caller identities in the subscriber information for defining a group of allowed caller identities, said allowed caller identities being either those included in or excluded from the group, determining whether the caller identity of an incoming forwarded call belongs to the allowed identities by comparing the caller identity with said group of caller identities, in response to receiving the call establishment signaling in the network element, continuing establishing the incoming forwarded call if the caller identity belongs to the allowed identities, and rejecting the incoming forwarded call if the caller identity does not belong to the allowed identities.

In a preferred embodiment the subscriber may define in his subscriber information a set of allowed calling party numbers from which also the forwarded calls are to be accepted. In response to having determined that the call has been forwarded, the calling party number indicated in the call establishment request is compared to the set of allowed numbers. If the calling party number does not belong to the set of allowed numbers the call is rejected. If the calling party number belongs to the set of allowed numbers the call establishment procedure is continued. Likewise, the negation of this set, i.e. the set of calling party numbers from which the forwarded incoming calls are not to be connected may be specified.

In another preferred embodiment, the set of disallowed forwarding numbers are defined, and the calls having been forwarded by a member of this set are rejected. Again, the negation of this set, i.e. the set of allowed forwarding numbers may be specified. In one implementation of the preferred embodiment, the intelligent network IN is utilized. In this implementation, the set of allowed numbers is stored in the intelligent network. In the exchange of the subscriber, the event of receiving a forwarded call is determined as an IN trigger. In response to having received a request to establish a call, the value of the call forwarding counter is checked to determine whether the call has been forwarded. If the call has been forwarded a query having the calling party number as its parameter is sent to the intelligent network. In the intelligent network, the set of allowed numbers is retrieved from the subscriber information of the called subscriber and the calling party number compared to the set. If the calling party number belongs to the set of allowed numbers the intelligent network instructs the exchange to continue the call establishment procedure. If the calling party number does not belong to the set of allowed numbers the intelligent network instructs the exchange to reject the call and to stop the call establishment procedure. An error message may be returned when rejecting the call. Alternatively, the exchange may be instructed to issue an announcement or to forward the call elsewhere, for example. The call may be forwarded to a network element capable of finding out the identity of the forwarding party, for example.

According to a second aspect of the invention, a telecommunication system is provided, comprising:

exchanges, subscribers, means for storing subscriber information including information about the service definitions of a subscriber, means for establishing calls to a subscriber via an exchange having access to the subscriber information of the subscriber, means for allowing a subscriber to define in his subscriber information that his incoming calls are to be forwarded to another subscriber, and means for indicating in the call establishment signaling the forwarding of a call, and optionally a caller identity, characterized in that the system further comprises:

storing means for storing a group of caller identities in the subscriber information for defining a group of allowed caller identities, said allowed caller identities being either those included in or excluded from the group, determining means for determining whether the caller identity of an incoming forwarded call belongs to the allowed identities by comparing the caller identity with said group of caller identities, in response to receiving the call establishment signaling in the network element, continuing means for continuing establishing the incoming forwarded call if the caller identity belongs to the allowed identities, and rejecting means for rejecting the incoming forwarded call if the caller identity does not belong to the allowed identities.

According to a third aspect of the invention, a network element for a telecommunication system is provided, having:

exchanges, subscribers, means for storing subscriber information including information about the service definitions of a subscriber, means for establishing calls to a subscriber via an exchange having access to the subscriber information of the subscriber, means for allowing a subscriber to define in his subscriber information that his incoming calls are to be forwarded to another subscriber, and means for indicating in the call establishment signaling the forwarding of a call, and optionally a caller identity, characterized in that the network element comprises:

storing means for storing a group of caller identities in the subscriber information for defining a group of allowed caller identities, said allowed caller identities being either those included in or excluded from the group, determining means for determining whether the caller identity of an incoming forwarded call belongs to the allowed identities by comparing the caller identity with said group of caller identities, in response to receiving the call establishment signaling in the network element, continuing means for continuing establishing the in coming forwarded caller identity belongs to the allowed identities, and rejecting means for rejecting the incoming forwarded call if the caller identity does not belong to the allowed identities.

According to a fourth aspect of the invention, a home location register for a mobile telecommunication system is provided, comprising:

exchanges, subscribers, means for storing subscriber information including information about the service definitions of a subscriber, means for establishing calls to a subscriber via an exchange having access to the subscriber information of the subscriber, means for allowing a subscriber to define in his subscriber information that his incoming calls are to be forwarded to another subscriber, and means for indicating in the call establishment signaling the forwarding of a call, and optionally a caller identity, characterized in that the home location register comprises:

storing means for storing a group of caller identities in the subscriber information for defining a group of allowed caller identities, said allowed caller identities being either those included in or excluded from the group, determining means for determining whether the caller identity of an incoming forwarded call belongs to the allowed identities by comparing the caller identity with said group of caller identities, in response to receiving the call establishment signaling in the network element, continuing means for continuing establishing the incoming forwarded call if the caller identity belongs to the allowed identities, and rejecting means for rejecting the incoming forwarded call if the caller identity does not belong to the allowed identities.

BRIEF DESCRIPTION OF THE DRAWINGS

The invention is described more closely with reference to the accompanying schematic drawings, in which.

DETAILED DESCRIPTION OF THE INVENTION

Some technical solutions for implementing the invention are illustrated below. The exemplary solutions assume that the ISUP (ISDN User Part) signaling protocol is used. However, the chosen signaling protocol has an effect only on the messages used, and the invention can just as well be implemented using some other signaling protocol.

When using ISUP, the following signaling information concerning forwarded calls can be used:

redirection number: Information sent in the backward direction indicating the number to which the call must be rerouted or has been forwarded.

call forwarding counter: Information sent in either direction indicating the number of redirections which have occurred on a call.

calling party number: the number of the calling party.

In addition, the specifications define also other information elements relating to call forwarding information. Examples of these elements are:

forwarding number: Information sent in the forward direction when a call is diverted, indicating the B subscriber number from which the call was forwarded.

redirecting reason: Information sent in either direction indicating, in the case of calls undergoing multiple redirections, the reason why the call has been redirected. These reasons include CFU, CFB, CFNRy and CFNRc.

redirecting indicator: Information sent in either direction, i.e. from the exchange of the forwarding subscriber (the forward direction) or vice versa (the backward direction) indicating whether the call has been diverted or rerouted and whether or not presentation of redirection information to the calling party is restricted.

forwarding indicator: Information sent in the backward direction to indicate whether the call has undergone diversion or rerouting. It also contains information about presentation restrictions.

redirection information: Information sent in either direction giving information about call redirection or call rerouting.

redirection number restriction indicator: Information sent in the backward direction indicating whether the forwarded-to user allows the presentation of his number.

The signaling information is presented more thoroughly in ITU-T (ITU=International Telecommunication Union, ITU-T=the ITU Telecommunication standardization sector) recommendations Q.762 and Q.763 published by ITU.

A plurality of the above pieces of signaling information may be used to determine if the call has been forwarded. The call may be determined having been forwarded if the forwarding number is present in the call establishment signaling, it has been observed that the operators usually do not use all the information fields presented above, but on the forwarded leg, only the calling number, forwarded-to number and the call forwarding counter are used in the call establishment signaling. It is therefore advantageous to use the call forwarding counter when determining whether the call has been forwarded or not.

Figure 3:
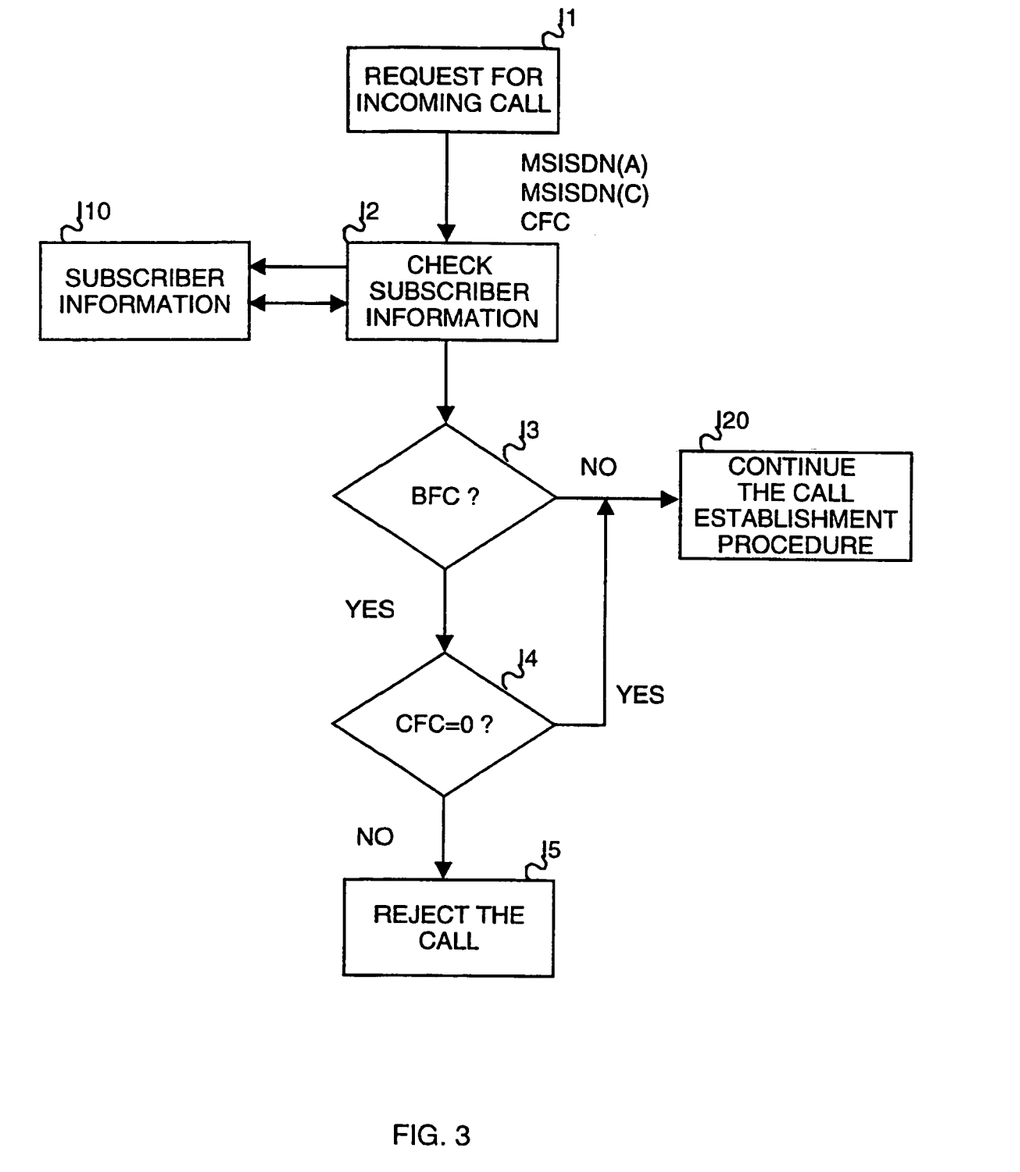
FIG. 3 shows a decision algorithm.

A decision flowchart for determining whether the call is forwarded or not and whether it is to be rejected or not is presented in FIG. 3. This algorithm may be running in the local exchange of a fixed network subscriber or in the mobile services switching center currently serving a mobile subscriber, for example. In this context, the word exchange is used to mean either a local exchange, a mobile services switching center or any similar network element participating the call establishment procedure and having access to the subscriber information of the subscriber the call is being routed to.

At stage I2 the exchange receives a request for establishing a call to subscriber C. In the request, at least the identity number such as the mobile station ISDN number of subscriber C and the value of the call forwarding counter CFC are given.

Having received the request, the procedure enters stage I2, in which the subscriber information of subscriber C is checked. This is done on the basis of a database query made in stage I10. The database may be, for example, an internal database of the local exchange, the Visitor Location Register VLR the mobile services switching center is connected to, or a database in the intelligent network. The query returns, among other things, the Forwarded Call Barring BFC flag.

The procedure now enters stage I3, in which the presence of the BFC flag is studied. If the flag is not present, i.e. flag=0, for example, the procedure goes to stage I20 in which the call establishment procedure is continued.

If the BFC flag is found to be present in stage I3, the procedure enters stage I4, in which the value of the call forwarding counter CFC is compared to the given threshold value 0. A value higher than this threshold is defined to be an indication of the call having been forwarded. If the comparison shows that the call has not been forwarded, i.e. CFC=0, the procedure enters stage I20, in which the call establishment procedure is continued.

If the comparison at stage I4 shows that the call has been forwarded, the YES branch is chosen, and the procedure enters stage I5 in which the call is rejected and the call establishment procedure interrupted. According to one preferred embodiment of the invention, the calling party is given an announcement telling the reason for the rejection of the call.

According to another preferred embodiment, the call is forwarded to a predefined destination. Preferably the call is forwarded to destination capable of determining the identity of the forwarding party. Different destinations for different situations, e.g. for
- calls from different calling subscribers,
- calls forwarded by different subscribers and
- calls forwarded for different reasons (i.e. CFU, CFNRc, etc.) may preferably be defined.

In a preferred embodiment the subscriber may define in his subscriber information a set of allowed numbers from which the calls are to be accepted even if the call has been forwarded. In his exchange, in response to having determined the call has been forwarded, the calling number indicated in the request for establishing a call is compared to the to the set of allowed numbers. If the indicated number does not belong to the set of allowed numbers the call is rejected. If the indicated number belongs to the set of allowed numbers, the call establishment procedure is continued. A special situation occurs when the calling party number is not indicated in the call establishment signaling. According to one embodiment, the subscriber may define such calls from unknown origination to be rejected or to be accepted. A flowchart showing the algorithm for decision making in this preferred embodiment of the invention is presented in FIG. 4.

Figure 4:
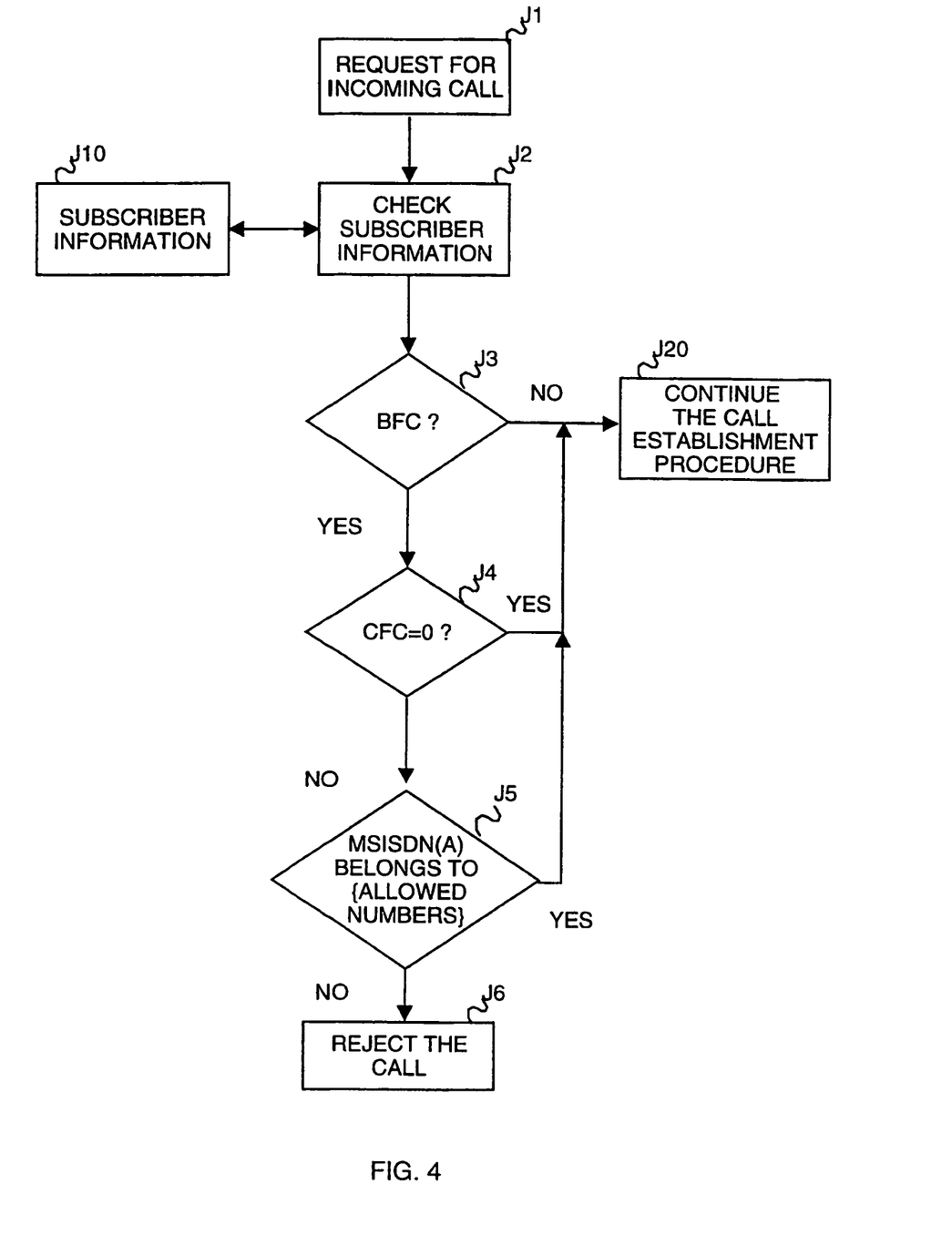
FIG. 4 shows a decision algorithm according to a preferred embodiment of the invention.

At stage J2 the exchange receives a request for establishing a call to subscriber C. In the request, at least the identity number such as the mobile station ISDN numbers of subscriber C and the calling party, i.e. subscriber A (MSISDNA) and the value of the call forwarding counter CFC are given.

The procedure then enters stage J2, in which the subscriber information of subscriber C is checked. This is done using the database query in stage J10. The query returns, among other things, the Forwarded Call Barring BFC flag and the set (ALLOWED NUMBERS) of allowed numbers.

The procedure now enters stages J3 and J4, in which the presence of the BFC flag and the value of the call forwarding counter CFC are studied. If the BFC flag is not present or the value of the call forwarding counter shows that the call has not been forwarded, the procedure goes to stage J20 in which the call establishment procedure is continued.

If both the BFC flag is present and the verification of the CFC shows that the call has been forwarded the procedure enters to stage J5, in which the calling party identity number MSISDN(A) is compared to the set {ALLOWED NUMBERS}. If MSISDN(A) belongs to the set, the procedure enters stage J20, in which the call establishment procedure is continued. If MSISDN(A) does not belong to the set the procedure enters to stage J in which the call is rejected and the call establishment procedure interrupted. According to a preferred embodiment of the invention, the calling party is given an announcement telling the reason of the rejection of the call. Again, the call may alternatively be forwarded to a predefined destination. It is, however, not essential to the above embodiment that both the BFC flag and the set of allowed numbers are stored in the same database. In that case it is adequate to query the database including the set of allowed numbers before stage J5.

The above presented embodiment is especially advantageous in telecommunication systems where some services are implemented using call forwarding. An example of such a service is the home call service, in which calls between two subscribers, subscribers A and B, are given a cheaper price. The service is used by dialing a given number, e.g. 020100, which is then mapped to the right subscriber number by the intelligent network, and the call is then established to this subscriber number. The call is seen to be a forwarded one. If all the forwarded calls would be barred also the home calls would be barred. However, for all the received calls according to the home call service the calling party number is the same. Using the above presented embodiment the home calls can then be accepted even when using the forwarded call barring service.

In another embodiment, the BFC flag is not a binary piece of information but has more possible values specifying the situation in which the forwarded calls are to be rejected. For example, the flag could comprise values for following situations:
- CFU,
- Call from an unknown number,
- CFNRc,
- CFNRy, and
- IN-based forwarding.

Thus, the subscriber is able to define only one or selected set of his forwarded incoming calls to be rejected, based on the redirection reason, for example. This embodiment can be used in networks in which the inter exchange signaling supports exchange of such information.

Figure 5:
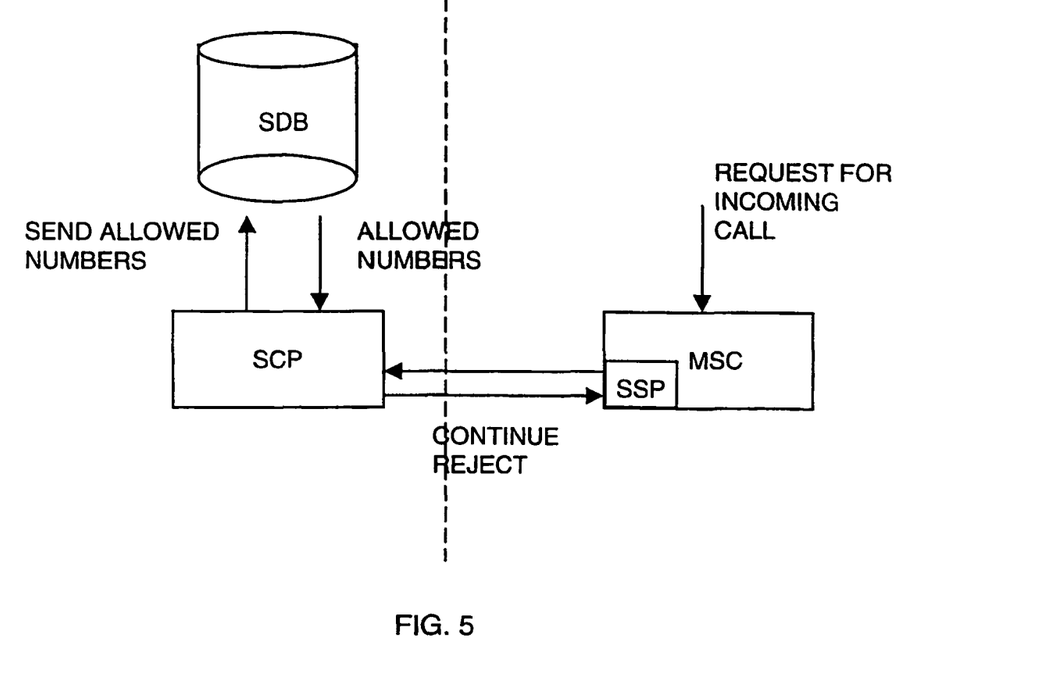
FIG. 5 shows a possible division of the tasks according to the invention between different network elements.

One preferred implementation of the above presented embodiment is shown in FIG. 5. According to the implementation, the functionality is distributed between the exchange and the intelligent network. The network elements of the intelligent network shown in the figure, are the service control point SCP and the service database SDB. In the exchange MSC, a service switching point SSP is implemented. According to the basic functionality of an intelligent network, the SSP follows the states of the calls. In the SSP some trigger conditions are defined. When a trigger condition is met, a message is sent to the SCP. The SCP receives the message, and controls the call based on the message and predefined configurations. The configurations are stored in the service database SDB.

In the exchange, the event of receiving an forwarded call is determined as a trigger. When receiving a request to establish a call to a subscriber, and determining that the calls has been forwarded and the subscriber has defined his forwarded incoming calls to be barred a query is sent to the intelligent network. The calling party number is included as a parameter in the query.

The set of allowed numbers for the subscriber is stored in the subscriber information of the subscriber stored in the intelligent network. In response to having received the query sent by the exchange, the set of allowed numbers is retrieved from the subscriber information of the called subscriber. If the calling party number belongs to the set of allowed numbers the intelligent network instructs the exchange to continue the call establishment procedure. If the calling number does not belong to the set the intelligent network instructs the exchange to reject the call.

In mobile telecommunication systems, the subscriber information is stored in the home location register HLR or in the intelligent network. The information stored in the HLR is copied to the visitor location register VLR connected to the mobile services switching center MSC currently serving the subscriber. The functionality of the invention may be distributed between the MSC and the VLR. In this embodiment, the subscriber data is stored in the VLR and the decision algorithm is running in the MSC.

The preferred embodiment can be implemented by storing also the set of allowed calling party numbers in the VLR and to run the decision algorithm in the MSC. Alternatively, the decision algorithm may be distributed between the MSC and the intelligent network IN. Then, the VLR only contains the value of the BFC flag. In response to detecting that the call has been forwarded and that the BFC flag is present in the subscriber info of the subscriber the call is being routed to, an IN query is triggered. The IN has the set of allowed numbers. Based on the calling party number indicated in the query, the IN determines whether the call is to be established or rejected, and instructs the MSC to do so.

According to one embodiment used for mobile telecommunication systems, the decision algorithm is running in the gateway mobile services switching center GMSC capable of making interrogations to the home location register of the subscriber. In this embodiment, the GMSC receives the request for establishing a call to subscriber C. In response to having received this request the GMSC sends a request SRI (Send Routing Information) for routing information to the home location register HLR(C) holding the subscriber information of the subscriber. In response to having received the message HLR(C) queries its database to find out the current VLR address VLR(C) and other subscriber information of the subscriber. VLR(C) is sent a request PRN (Provide Roaming Number), and VLR responds by allocating a roaming number and sending it to HLR(C) in the acknowledgement message PRNack. HLR(C) receives the message PRNack and sends the roaming number MSRN (Mobile Subscriber Roaming Number) to the GMSC in the acknowledgement message SRIack. According to the invention HLR(C) in addition informs the GMSC about the presence of the BFC flag. This information may be sent, e.g., in the extension field of the message SRIack.

Figure 6:
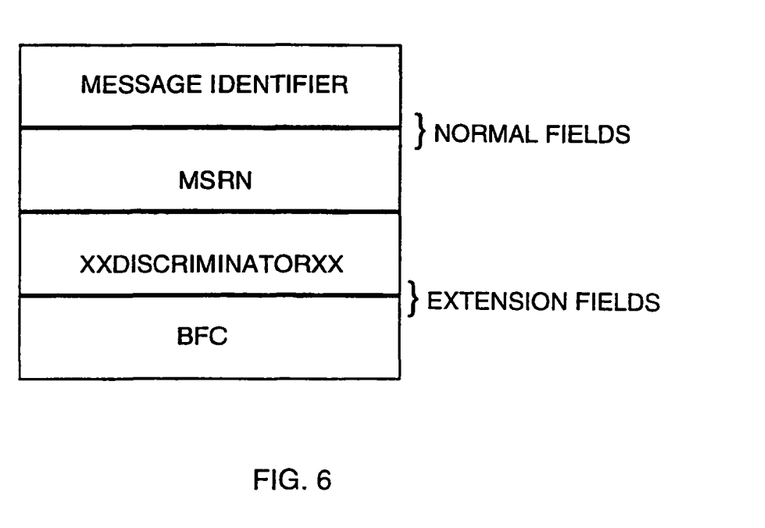
FIG. 6 shows the structure of a message.

The structure of the SRIack message is shown in FIG. 6. The message has normal fields and the extension fields. In the normal fields, the message identifier identifying message and the dialog between the GMSC and the HLR and the MSRN are given using the coding according to the specifications. The extension field is separated from the normal field by a discriminator. The BFC flag is transferred in the extension field. It must be noted that the BFC flag may as well be transferred in the normal fields of the SRIack message if the coding of the flag is specified in the specifications.

The GMSC now studies based on the value of the call forwarding counter whether the call has been forwarded (stage I3) and whether the BFC flag is present (I4). If the call is forwarded and the BFC flag is present, the call is rejected. In all the other cases the call establishment is continued.

To comply with the preferred embodiment utilizing the predefined set of allowed calling party numbers HLR(C) returns the set to the GMSC in addition to the BFC flag. If the call is forwarded and the BFC flag is present, the calling party number is then compared to the set of allowed numbers. If the calling party number does not belong to the set the call is rejected or, alternatively, forwarded to a prespecified destination. In all the other cases the call establishment is continued.

In another embodiment, the information about the call having been forwarded and the calling party and/or the forwarding party number and preferably also the redirecting reason are sent to the HLR in the extension field of the message SRI. Having received this information the HLR may determine whether the call is to be allowed or rejected, and instructs in the message SRIack the GMSC to do so.

Another implementation of the preferred embodiment of the invention utilizes the intelligent network. Now, if the GMSC determines that the call has been forwarded and the BFC flag is present, an IN query is triggered. In the query, the calling party number is given as a parameter. The IN holds knowledge of the set of allowed numbers. In response to having received the query the IN compares the calling party number to the set of allowed numbers to determine whether the call is to be established or rejected, and instructs the GMSC to do so.

The major advantage of implementing the decision algorithm according to FIG. 4 is the presence of the calling party number in the call establishment signaling. Although the specifications enable the transmission of calling party number also in the international signaling this information is not always transferred in the signaling between exchanges in different countries.

The above implementations having the decision algorithm running at the GMSC have the problem of allocating the MSRN in vain because the VLR is not contacted using the allocated MSRN. The MSRN has then to be deallocated after a given delay or by using a special message deallocating the MSRN.

According to yet another embodiment of the invention, set of disallowed forwarding numbers is defined. In this embodiment, the forwarding party number is compared to this set, and the call is rejected if the forwarding number belongs to the set of disallowed numbers. In one implementation of this embodiment, the forwarded calls are accepted if the forwarding number is not indicated in the call establishment signaling. In another implementation the forwarded calls are rejected if the forwarding number is not indicated in the call establishment signaling. The problem of this embodiment is, however, that the operators do not always include the forwarding number in the signaling information used in the call establishment procedure.

Figure 7:
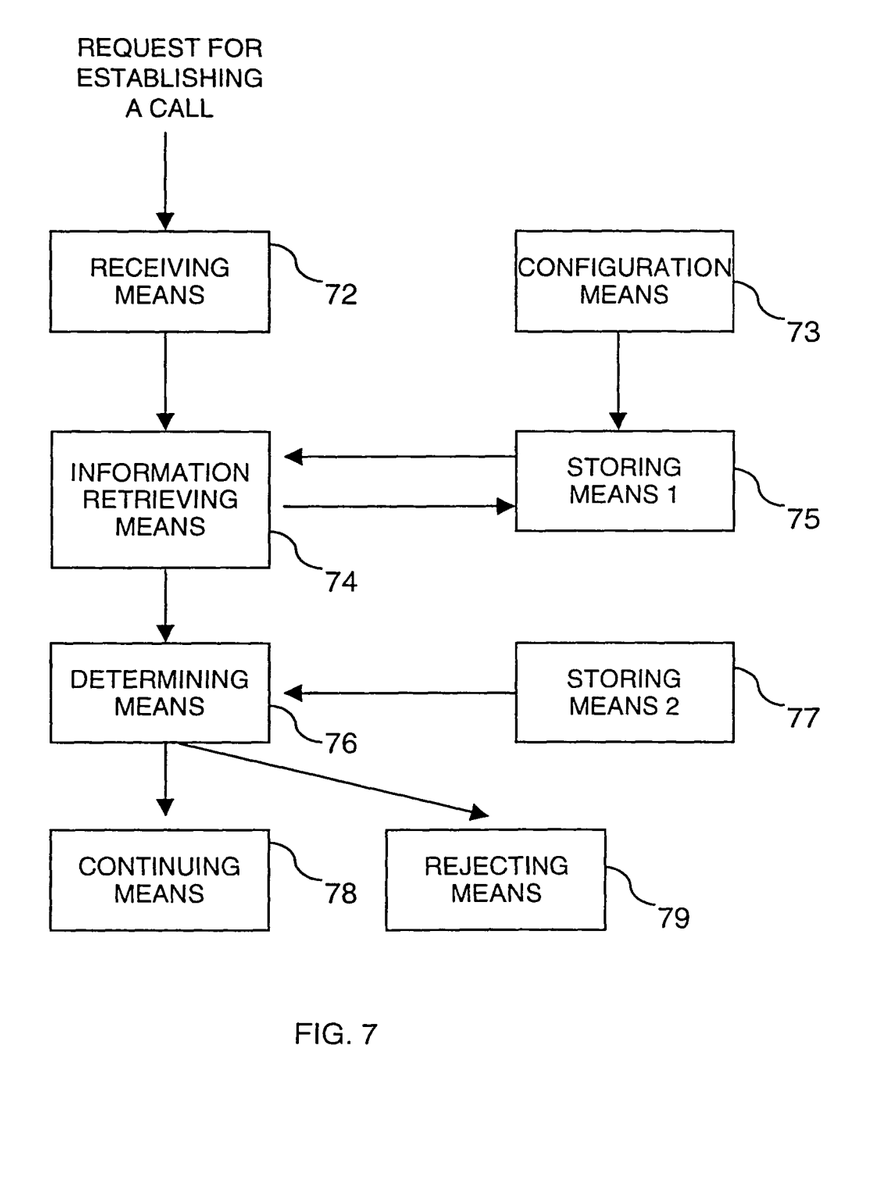
FIG. 7 shows functional entities of a telecommunication system.

One of the objectives of the invention is a telecommunication system implementing the above presented method. The functional entities of a telecommunication system according to the present invention are shown in FIG. 7. The system has     storing means 75,77 for storing information on whether the forwarded incoming calls to a subscriber have been determined to be rejected,     receiving means 72 for receiving a request for establishing a call to the subscriber,     information retrieving means 74 responsive to the receiving means 72 for determining, based on the request for establishing a call to the subscriber whether the call has been forwarded, and retrieving information on whether the subscriber has defined in his subscriber information that all calls forwarded to him are to be rejected, determining means 76 responsive to the information retrieving means and having the functionality of determining whether the call is to be rejected or allowed, and continuing means 78 and rejecting means 79 both responsive to the determining means 76.

Preferably, the information retrieving means 74 is arranged to determine whether the call has been forwarded based on the value of the call forwarding counter.

To comply with the preferred embodiment of the invention, some additional arrangements in the functional entities of the system have to be made. These arrangements are the following:

the storing means 75,77 is arranged to store information about a set of allowed numbers, the information retrieving means 74 is further arranged to retrieve the set of allowed numbers from the storing means and the calling party number from the request for establishing a call received by the receiving means, and the determining means 76 is further arranged to compare the calling party number to the set of allowed numbers, and to determine the call to be allowed if the calling party number belongs to the set.

To comply with another preferred embodiment in the system, in which the forwarding party number is indicated in the signaling for establishing a call, the following arrangements have to be made:

the storing means 75,77 is further arranged to store information about a set of allowed forwarding numbers, the information retrieving means 74 is further arranged to retrieve the set of allowed forwarding numbers from the storing means and the forwarding party number from the signaling for establishing a call received by the receiving means 72, and the determining means 76 is further arranged to compare the forwarding party number to the set of allowed forwarding numbers, and to determine the call to be allowed if the forwarding party number belongs to the set.

The entities may be implemented in a single network element or they may be distributed between a plurality of network elements. According to one embodiment, all the functionalities are implemented in the local exchange of a fixed network subscriber. In this embodiment, the all the necessary subscriber information is stored in an internal database of the local exchange.

According to another embodiment, the functionalities are distributed between the local exchange and the intelligent network. Receiving means 72 are implemented in the local exchange. The storing means (75,77) as well as the continuing means 78 and the rejecting means 79 are distributed between the local exchange and the intelligent network.

In mobile telecommunication systems the decision algorithm may be implemented in the MSC currently serving the subscriber. In this embodiment, the storing means are implemented in the VLR connected to the MSC. All the other means are implemented in the MSC.

If the intelligent network IN is used, the storing means is distributed between the VLR (75) and the intelligent network (77). The determining means 76, the continuing means 78 and the rejecting means 79 are as well distributed between the MSC and the IN.

In another embodiment, the decision algorithm is implemented in the gateway MSC GMSC. In this embodiment, the storing means are implemented in the HLR holding the subscriber information. According to a preferred embodiment the HLR is arranged to send the BFC flag in the extension field of the SRIack message, and the GMSC is arranged to read the flag from said extension field.

If the intelligent network IN is used, the storing means are distributed between the HLR (75) and the intelligent network (77). The determining means are as well distributed between the GMSC and the IN.

In a preferred embodiment the system has in addition configuration means 73 for configuring the subscriber information stored in the storing means 75,77. These means are connected to the storing means. One embodiment of such means is a connection from the network management system of the network operator to the relevant network elements. In this embodiment, the subscriber may change the configuration of his services by calling the network operator and requesting the operator to do the changes.

Figure 8:
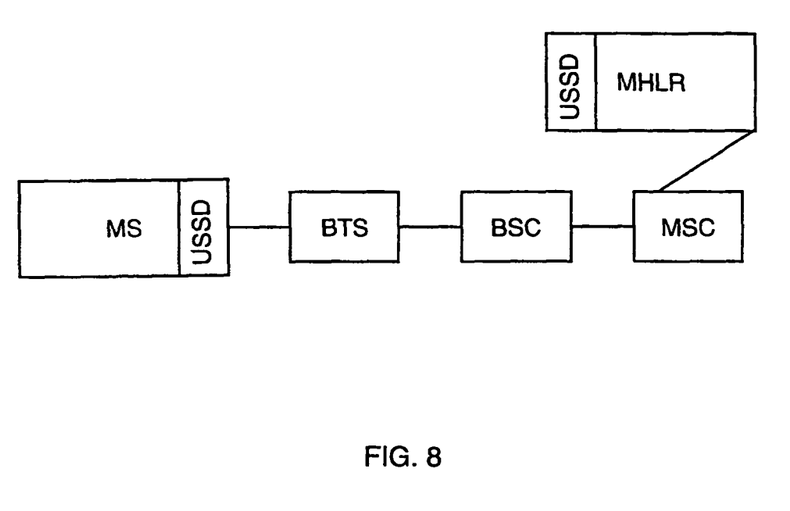
FIG. 8 shows a system for configuring subscriber information.

According to another embodiment, the subscriber is able to change his service configuration himself. The configuration can take place using DTMF dialing, and especially in the mobile telecommunication systems such as the GSM special signaling such as the unstructured supplementary service data USSD signaling between the storing means such as the HLR and the mobile station. Such an implementation is schematically shown in FIG. 8. According to the figure, the mobile station MS has an USSD application. This application is arranged to communicate with the USSD application of the home location register HLR. The USSD signaling used to transfer the messages between the applications is routed via the base transceiver station BTS, the base station controller BSC and the MSC. Using the USSD application of his mobile station, the subscriber may configure his subscriber information such as the BFC flag and the set of allowed numbers in the HLR. The information stored in the intelligent network may be configured using a similar signaling method between the mobile station and the SCP of the intelligent network.

In the above exemplary embodiments, the invention is implemented in a system utilizing the ISUP protocol. However, the scope of the invention as defined by the appended claims is not limited to systems utilizing ISUP protocol. The only limitation concerning the signaling protocols is that the protocols used must provide a means for transferring between the network elements the necessary information about the forwarded call. It must as well be understood that the order of the steps may vary within the scope of the invention. For example, the value of the counter CFC may be verified before checking the presence of the BFC flag.

The invention claimed is:

1. A method comprising:

receiving an incoming call originating from a calling party and directed to a subscriber, said incoming call comprising an identity of the calling party;

determining that the incoming call is a forwarded call;

using the identity of the calling party to query a tangibly embodied database storing subscriber information concerning selective call forwarding of incoming forwarded calls;

determining from the query that incoming calls from the calling party which are incoming forwarded calls directed to the subscriber are to be forwarded to a third party;

in response to the determining, a network node directing the received incoming forwarded call to the third party so as to bypass the subscriber, forwarding the call to the third party, and incrementing a value of a call forwarding counter; and comparing the value of the call forwarding counter to a predefined value to determine whether the call is a forwarded call.

2. The method according to claim 1, in which at least one of:

the subscriber information for the subscriber concerning selective call forwarding of incoming forwarded calls comprises a tangibly stored list of caller identities that are not to be forwarded, and the determining from the query depends on the identity of the calling party failing to match any caller identity in the list; and the subscriber information for the subscriber concerning selective call forwarding of incoming forwarded calls comprises a tangibly stored list of caller identities that are to be forwarded, and the determining from the query depends on the identity of the calling party matching at least one caller identity in the list.

3. The method according to claim 1, in which determining that the incoming call is a forwarded call comprises checking a call forwarding counter CFC of the incoming call.

4. The method according to claim 1, in which determining that the incoming call is a forwarded call comprises checking the incoming call for a number that is associated with a home call service for calls between two subscribers.

5. The method according to claim 1, in which the identity of the calling party comprises a mobile station ISDN number.

6. The method according to claim 1, in which the method is executed by the network node which comprises at least one of a home or visiting location register of the subscriber, a home or visiting location register of the third party, and a mobile switching center.

7. The method according to claim 1, in which the third party is a roaming number for the subscriber.

8. The method according to claim 1, in which the query to the tangibly embodied database further includes an indication of a reason the received incoming call has been forwarded, and in which the subscriber information concerning selective call forwarding of incoming forwarded calls further concerns call forwarding reasons.

9. The method according to claim 1, in which the subscriber information used to determine the response to the query is established by the subscriber and stored at the tangibly embodied database.

10. A node of a communications network comprising:

a receiver configured to receive an incoming call originating from a calling party and directed to a subscriber, said incoming call comprising an identity of the calling party;

a determination unit configured to determine that the incoming call is a forwarded call;

an information retrieving unit configured to use the identity of the calling party to query a database storing subscriber information concerning selective call forwarding of incoming forwarded calls, and to determine from the query that incoming calls from the calling party which are incoming forwarded calls directed to the subscriber are to be forwarded to a third party;

a continuation unit configured, in response to the information retrieving unit, to direct the received incoming forwarded call to the third party so as to bypass the subscriber, forwarding the call to the third party, and incrementing a value of a call forwarding counter; and comparing the value of the call forwarding counter to a predefined value to determine whether the call is a forwarded call.

11. The node of the communications network according to claim 10, in which at least one of:

the subscriber information for the subscriber concerning selective call forwarding of incoming forwarded calls comprises a list of caller identities that are not to be forwarded, and the result of the query depends on the identity of the calling party failing to match any caller identity in the list; and the subscriber information for the subscriber concerning selective call forwarding of incoming forwarded calls comprises a list of caller identities that are to be forwarded, and result of the query depends on the identity of the calling party matching at least one caller identity in the list.

12. The node of the communications network according to claim 10, in which the determination unit is configured to determine that the incoming call is a forwarded call by at least checking a call forwarding counter CFC of the incoming call.

13. The node of the communications network according to claim 10, in which the determination unit is configured to determine that the incoming call is a forwarded call by checking the incoming call for a number that is associated with a home call service for calls between two subscribers.

14. The node of the communications network according to claim 10, in which the identity of the calling party comprises a mobile station ISDN number.

15. The node of the communications network according to claim 10, in which the node comprises at least one of a home or visiting location register of the subscriber, a home or visiting location register of the third party, and a mobile switching center.

16. The node of the communications network according to claim 10, in which the third party is a roaming number for the subscriber.

17. The node of the communications network according to claim 10, in which the information retrieving unit is configured to include in the query of the database an indication of a reason the received incoming forwarded call was forwarded, and in which the subscriber information concerning selective call forwarding of incoming forwarded calls further concerns call forwarding reasons.

18. The node of the communications network according to claim 10, in which the subscriber information used for responding to the query is established at least in part by the subscriber and tangibly stored at the database.

* * * * *